May 17, 1938.　　S. E. BUETTELL　　2,117,274
VEHICLE STORAGE SYSTEM
Filed May 21, 1928　　4 Sheets-Sheet 3

Inventor:
Samuel E. Buettell
By John E. Gardner
Atty.

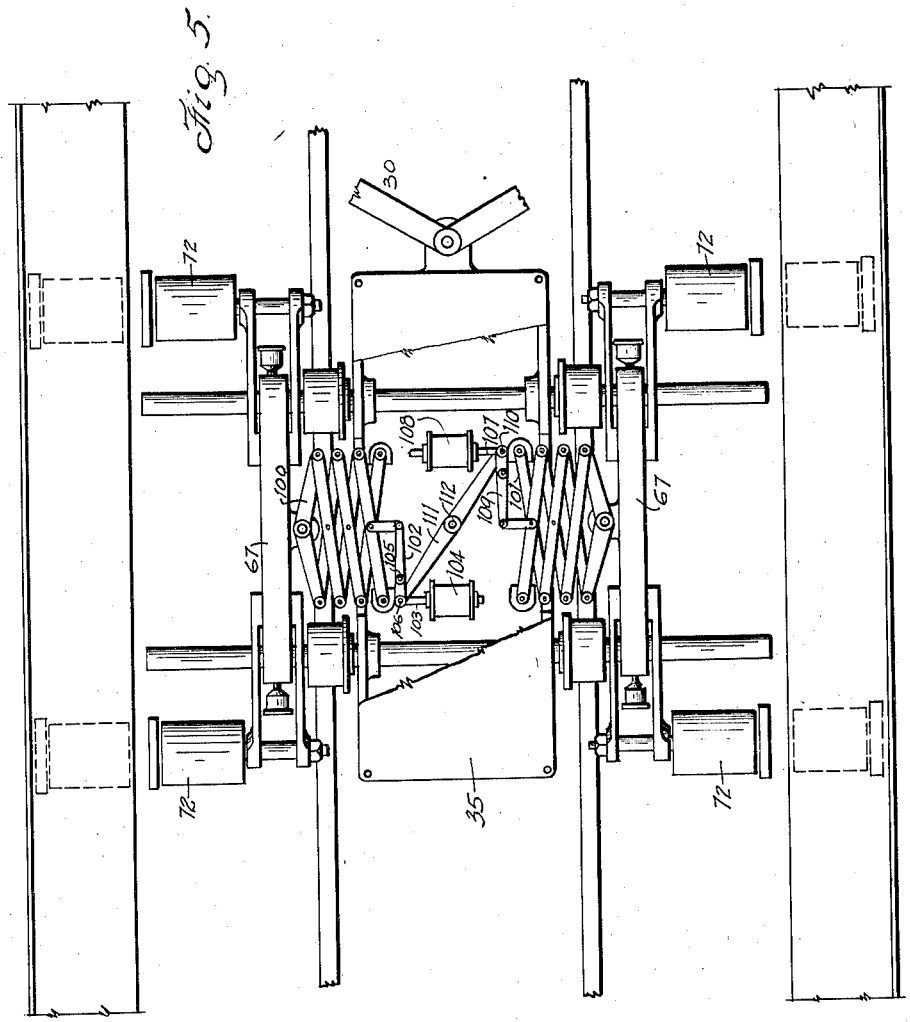

Patented May 17, 1938

2,117,274

UNITED STATES PATENT OFFICE 2,117,274

VEHICLE STORAGE SYSTEM

Samuel E. Buettell, Chicago, Ill., assignor to Cross Parking Systems, Inc., a corporation of Illinois Application May 21, 1928, Serial No. 279,515

11 Claims. (Cl. 214—16.1)

The present invention relates in general to vehicle storage systems and more particularly to such systems in which any automatic or semi-automatic machinery is employed to handle vehicles.

An object of the present invention is to provide improved means for mechanically moving the car or vehicle on to an elevator and then to place it in a storage stall.

Another object is to associate this mechanical equipment with the elevator so as to render it common to a plurality of storage stalls on each floor of a multi-floor storage structure.

Another object is to provide mechanical means in which the movement of the vehicle may be controlled at a relative high rate of speed.

A further object is to provide vehicle engaging means associated with the elevator, but which is adapted to be shifted in front of any stall to propel a vehicle into the stall or retrieve it therefrom.

There are other objects of my invention, which together with the foregoing will be described in the detailed specification which is to follow, taken in conjunction with the accompanying drawings.

The car handling mechanism illustrated in the present invention is particularly adapted to function in multi-floor storage buildings in which the number of floors varies between one and fourteen stories in height, where it is not essential to store or deliver the vehicles at a high rate of speed.

Referring now to the drawings:

Fig. 5 is a top plan view of one of the truck like structures, illustrating a modification of my invention.

In the accompanying drawings, like reference characters apply to similar parts throughout.

Referring now particularly to Figs. 1 to 4, inclusive, I shall describe the mechanical construction of my improved handling mechanism and its functions in storing cars in a typical garage structure.

Figure 1:
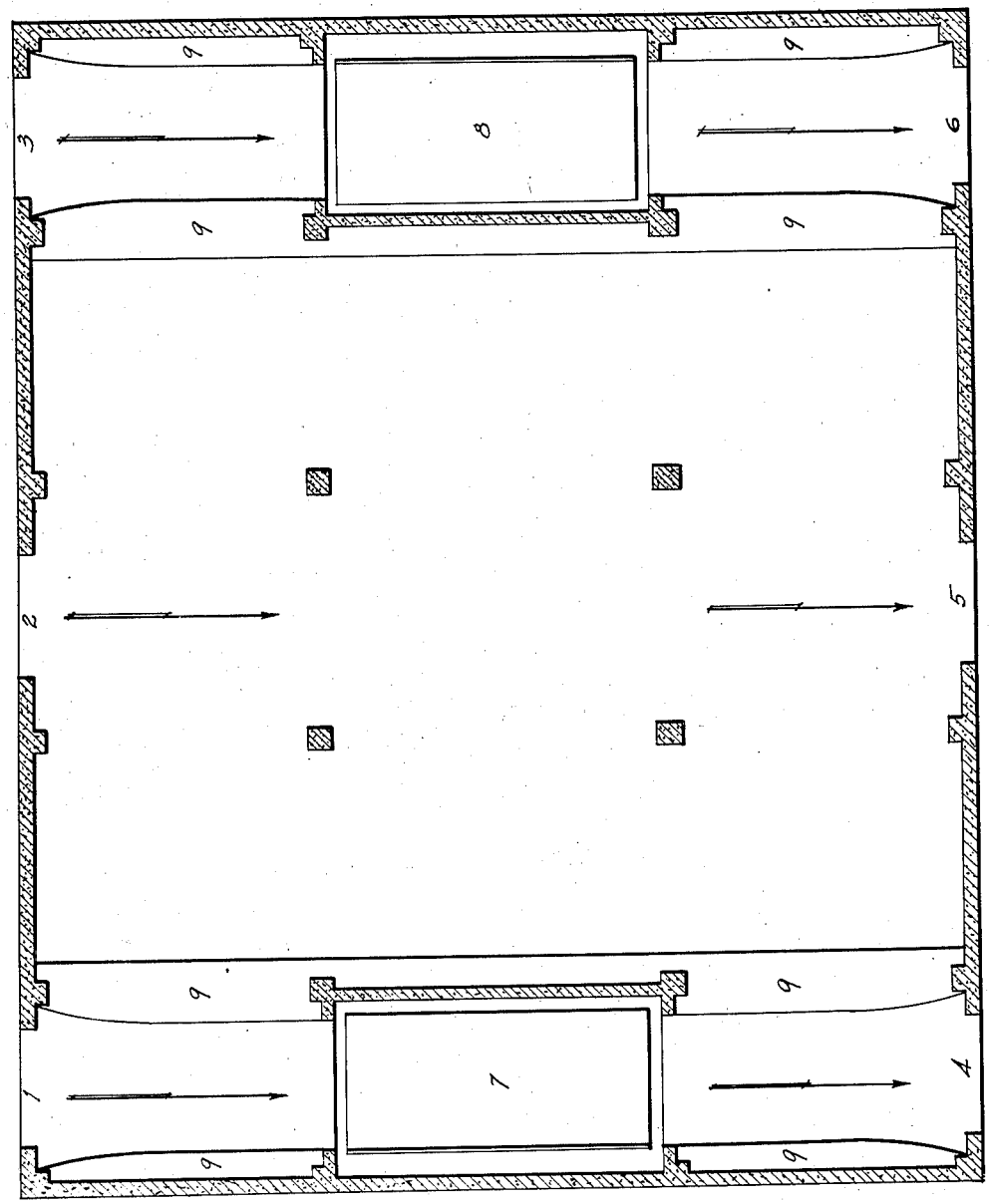
Fig. 1 is a floor plan of a typical garage structure to which my invention is applied.

In Fig. 1, the reference characters 1, 2 and 3 designate three entrances to the garage. Three exits 4, 5 and 6 are provided on the opposite side of the building, though they may be arranged in any convenient manner and might even be entirely eliminated and the entrances, or one of them, used for exits by employing turn-tables. Two elevators 7 and 8 of any usual construction are shown at either end of the building. These elevators may be of the corner post type in order to provide for movement of the vehicle handling mechanism transversely over the length of the building. The floor of the structure is usually raised, as illustrated at 9, in order to provide trackways for the vehicle so that the vehicle wheels are properly aligned. Automobiles entering into the entrance 1 or 3 drive into a position opposite one of the elevators 7 or 8 under their own power. The automobile engine is then turned off and the car may be locked in any manner desired. The automobile is not moved again under its own power until after delivery to the customer. Automobiles arriving at the entrance 2, may drive to a position in line with a position that they would assume in either of the entrances 1 or 3 in order to be available to the vehicle handling equipment, if desired, otherwise they may be stored in the open floor space between the two elevators and not handled mechanically. Each of the entrances and exits may be provided with a door that is preferably automatically opened. The automatic handling mechanism carried by the elevator and permanently associated therewith, is adapted to handle one vehicle at a time and it is possible by means of this mechanism to place a vehicle into anyone of the plurality of storage stalls on any floor, even though these storage stalls are not adjacent to the elevator hatchway as will appear. The speed of these elevators is determined to a great extent by the exigencies of the particular garage in which they are located. The space on the ground floor of the building between the entrances and the exits might be used for storage racks, waiting rooms, repair shop or the like, instead of to provide an additional entrance and exit. Another suggested modification would be that the entrances and exits might be the same and in this case turn tables would be provided to position properly the cars leaving the garage. The entrances or exits might be on different floors, for example, the entrances might be on the first floor and the exits in the basement.

From the plan of the ground floor, it will be seen that the vehicle handling mechanism upon the elevators must be adapted to take a vehicle from one of the entrance positions, place it on the elevator, raise it to the proper floor and deposit it in any one of a plurality of storage stalls on any floor, irrespective of whether this stall is located adjacent to the elevator hatchway on either side of the building and to perform a similar operation in order to deliver a car.

Each of the elevators moves in a shaft or hatchway which extends upward toward the top of the building. A by-pass type of fire door is provided on either side of the elevator on every floor to provide entrances to the storage stalls adjacent to the elevator hatchways. In order to permit the vehicle handling mechanism to move transversely off the elevator onto the storage floor, a by-pass type of fire door is provided at the side of the elevator. This fire door is of the truckable sill type and is cut away at points adjacent to the rails that the vehicle carrier runs on and small sections of rails are mounted thereon in order to bridge the gap between the elevator and the storage floor in a manner that will appear. The use of the fire doors completely closes the elevator shafts while the elevators are running. The two fire doors opposite one another on each floor may also be of the truckable sill type. The various fire doors on each floor may be automatically operated when the elevator comes to a position to receive a vehicle or to discharge one or to place one in storage.

So far as the building construction is concerned, it may be of the usual type employed for lower buildings where brick or reinforced concrete is used. The individual storage stalls are simply made up of standard structural shapes, forming trackways adjacent to each other and arranged tier on tier and separated by floors.

Figure 2:
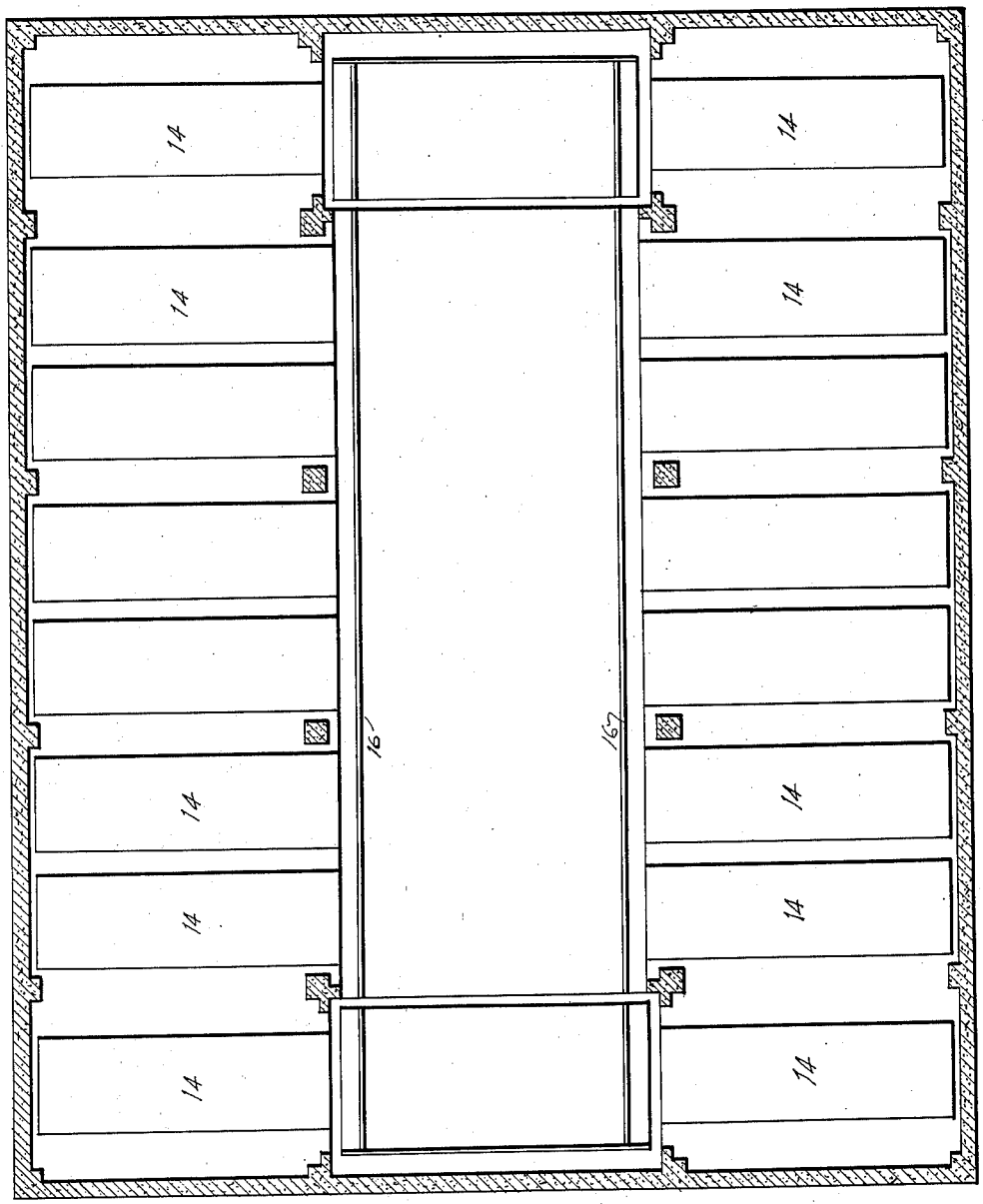
Fig. 2 is a plan of a typical storage floor in the garage of Fig. 1.

Fig. 2 illustrates a typical plan of one of the storage floors showing the vehicle handling mechanism of each of the elevators, having access normally to eight stalls, four on each side of the building. It will be appreciated that the vehicle handling mechanism may move into the territory normally served by the vehicle handling mechanism on the other elevator, if for any reason it becomes desirable. It will be understood that each of the storage floors is laid out in a similar manner. The center aisle of each storage floor is somewhat lower than that portion of the floor under the storage racks in order to provide room for movement of the vehicle handling mechanism. This may be seen in the cross section in Fig. 4. In the event that an elevator goes out of service, the vehicle handling mechanism on the other elevator can serve all the stalls normally served by the mechanism on the other elevator with the exception of the two stalls on each floor, adjacent to the other elevator hatchway. If necessary, the cars stored in these two end stalls may be moved to other stalls in any manner, such as providing a sling arrangement that may be attached to the car, the sling moving on rails attached to the ceiling of the garage.

It will be appreciated that one elevator may be employed to serve the arrangement shown, unless the volume of traffic requires the installation of another elevator. The volume of traffic might require another elevator in certain types of buildings, in which instance, the elevator would be inserted between the elevators 7 and 8, as illustrated.

Figure 3:
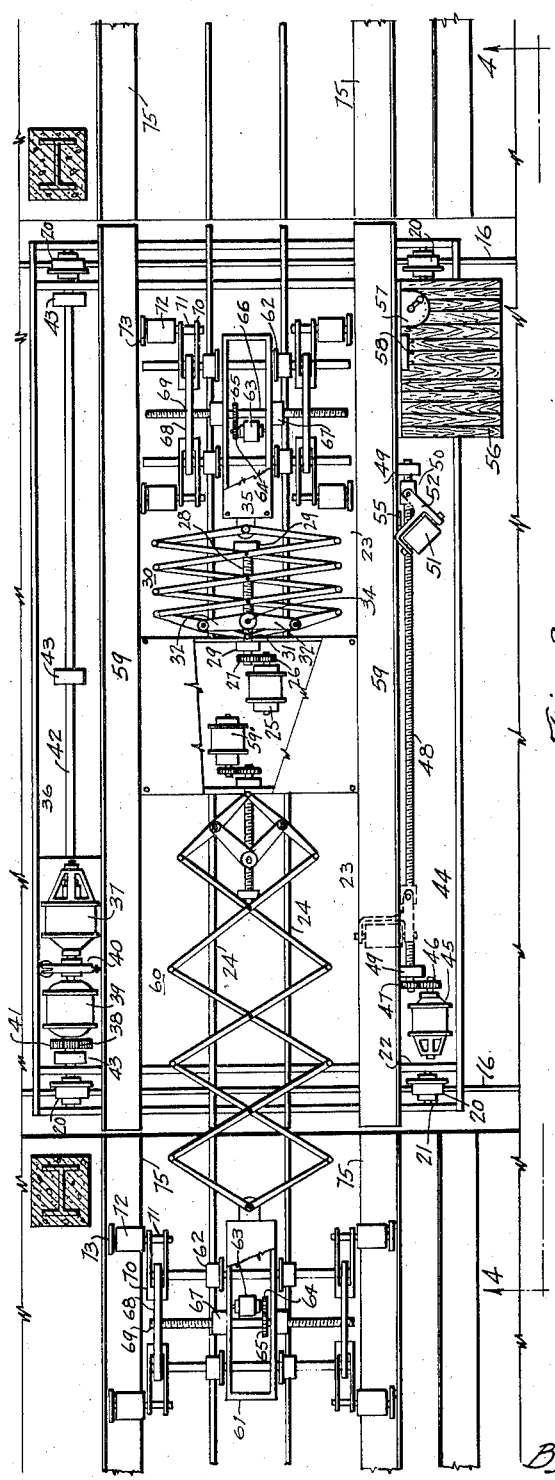
Fig. 3 is a top plan view of the vehicle handling equipment illustrating the carrier frame which brings about the transverse movement of the vehicle and the two trucks that are adapted to project the vehicle into a stall on either side of the carrier frame.
Figure 4:
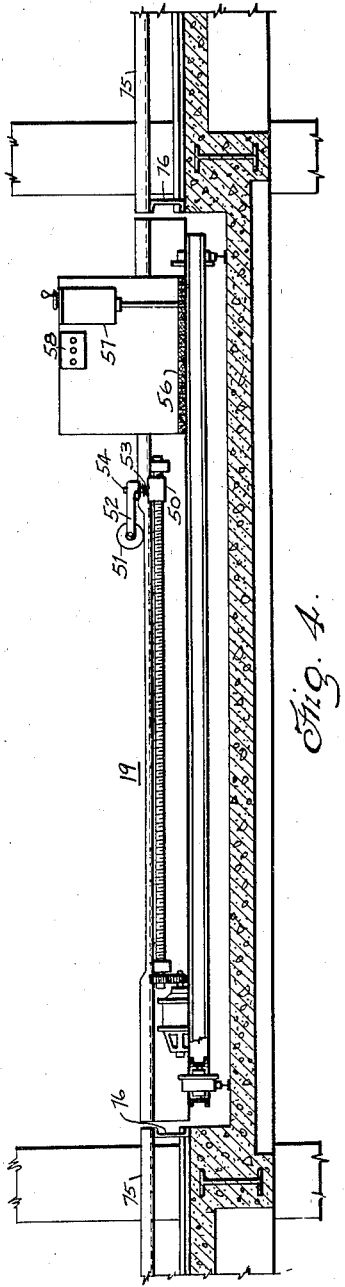
Fig. 4 is a side elevation along the line 4—4 of Fig. 3 of the vehicle handling mechanism.

Referring now to Fig. 3, a top plan view of vehicle handling mechanism moved out on to the floor showing the positioning truck extended in one of the stalls to the left. The vehicle handling mechanism is mounted upon an elevator platform which is provided with two rails, running transversely to the stalls. The carrier is shown out on the floor supported on the rails 16. The car handling mechanism comprises the carrier frame 19, which is built of standard structural shapes in the form of a rectangle and is mounted upon flanged wheels 20, travelling on the rails 16. These wheels rotate in bearings 21, formed into extending brackets 22, firmly secured to the carrier frame 19 in any suitable manner. Each end of the carrier frame 19 is provided with a platform 23, supporting rails 24, extending in a direction parallel to the stalls. A motor 25 is suitably mounted on the carrier frame and drives a spur gear 26 that is adapted to mesh with the spur gear 27, attached to a screw shaft 28. The screw schaft 28 is carried in bearings in suitable brackets 29 attached to the carrier frame 19. A lazy tong arrangement of levers 30 is suitably affixed to the carrier frame at the pivot point 31 and is adapted to be operated through the operating arms 32, suitably affixed to a nut 34, threaded on the screw shaft 28. The end of the lazy tongs 30 are attached to the steel casting 35 of the positioning truck in order to provide for its movement. It will be seen that by rotating the screw shaft 28, the lazy tongs 30 are extended or retracted to move the transfer truck casting 35. The carrier frame 19 carries an extension platform or base plate 36, and mounted upon one end thereof is a motor 37 adapted to drive the gear 38 through the gear reducer 39 and the brake 40. The gear reducer 39 and brake 40 may be of any suitable or well known construction. The spur gear 38 meshes with the spur gear 41 splined to the shaft 42 connecting the two carrier frame driving wheels 20. Thus, by the operation of the motor 37, the carrier frame 19 may be moved transversely. The shaft 42 is adapted to rotate in suitable bearings 43 attached to the carrier frame 19. On the other side of the carrier frame 19, a platform 44 is positioned. This platform 44 has a motor 45 mounted thereon that is adapted to drive the spur gear 46 that meshes with the spur gear 47 affixed to one end of the screw shaft 48. The shaft 48 is mounted in suitable bearings 49 affixed to the carrier frame. The screw shaft 48 carries a nut 50 on which is mounted a roller 51 in a suitable bracket 52. A spiral spring 53 (Fig. 4) encircles pin 54 and is attached to the bracket 52 and to the nut 50. Thus, when the nut 50 is carried into the position shown in Fig. 3, a cam surface 55 attached to the carrier frame engages the bracket 52 and swings it out in position shown. When the nut 50 starts to travel along the screw 48 in the other direction, the spring serves to swing the bracket 52, carrying the roller 51 into the position shown by the dotted lines. The spiral spring 53 also serves to hold the roller 51 against the vehicle trackway.

An elevator operator's platform 56 is suitably affixed to the carrier frame and carries a controller 57 of any usual construction for controlling the transverse movement of the carrier frame. A push button control board 58 is also mounted on the elevator operator's platform 56 and brings about the functioning of the positioning trucks 35 and 61. Automobile wheel tracks 59 are suitably mounted upon the carrier frame. These wheel tracks consist simply of angles with their upstanding legs forming flanges for the vehicle wheels. The vehicle tracks 59 extend the full length of the carrier frame 19 and are mounted upon the structural shapes comprising the carrier frame 19 in any desired manner.

Another motor 59' is suitably mounted on the carrier frame and serves to operate the lazy tongs 60 attached to the truck 61. The construction of the mechanism for operating the lazy tongs 30 and 60 is identically the same, as are the transfer trucks 35 and 61.

The construction of the transfer truck 35 will now be described. As beforementioned, the positioning truck 35 comprises essentially a rectangular steel casting which is mounted upon four wheels 62, resting upon the rails 24 of the carrier frame. A motor 63 is mounted upon the steel casting 35 and is adapted to drive a spur gear 64 that meshes with the spur gear 65 attached to the roller arm spreader shaft 66. The roller arm's spreader shaft 66 is carried in suitable bearings 67 of the truck 35 and is provided on either side of the truck with threads. The roller arm spreaders 68 carry a nut 69 that is threaded on the threads of the spreader screw 66 in any suitable manner. The roller arm spreaders carry at their ends pivoted brackets 70 of generally U shape. On the end of each roller arm bracket 70, there is mounted a roller arm shaft 71 carrying a roller 72 that is adapted to engage the vehicle wheel. On the outer end of the roller arm shaft 71, there is fastened an idler 73 of slightly larger diameter than the diameter of the roller 72. The idler 73 is provided for the purpose of carrying the weight of the vehicle in the event that the vehicle wheels should be locked.

The positioning truck 61 is constructed in identically the same manner as the truck 35 and need not be described.

In order to provide stalls for the vehicles, a plurality of tracks are spaced apart so that there are two tracks forming runways for the vehicles in each of the storage stalls 14. The construction of these tracks can be seen from Figs. 3 and 4. Each storage rack is formed by laying two angles 75, properly spaced parallel to each other. These angles are supported on suitable channels 76 attached to the floor. The height of the trackway is determined by the depth of the positioning trucks 35 and 61. The angles 75 have their upstanding ends on their outer side and these upstanding ends form guides for the vehicle wheels. The angles 75 in each stall are suitably spaced apart so as to accommodate the various gauges of automobiles, it having been found that a mean spacing can be employed, which will serve the various makes of automobiles. A rounded depression is formed in each of the angles 75 to lock the car against movement. The location of the depressions in the track angles 75 is not shown in the drawings as it is at the far end of the storage racks. The location of these depressions is fixed and is in line with the stopping point of the positioning trucks 61 and 35 when they are projected into the storage racks. By this arrangement it can be readily seen that the location of the depressions is such to accommodate the longest wheel based car so that the end adjacent to the automobile carrier 19 will clear.

I shall now briefly outline the operation of the car handling apparatus in taking a car from a loading station to a storage stall and in retrieving a car from a storage stall and delivering it at the delivery station.

It will be assumed that a customer drives his automobile into the entrance such as 1 of the garage, and places the car at the loading station before the elevator 7. In order to load the car onto the carrier frame 19, mounted on the elevator platform, the elevator operator will depress one of his push buttons in order to bring about the energization of the motor 25 to turn the screw shaft 28. By turning the screw shaft 28, the lazy tongs 30 project the positioning truck 35 adjacent to the rear wheels of the vehicle where a limit switch brings about the de-energization of the motor 25. The motor 63 is now energized to operate the shaft 66 to move the roller arm spreaders 68 and consequently the rollers 72 so that these rollers are placed in position on either side of the rear wheels of the vehicle. The motor 25 is now energized to drive the screw shaft 28 in a reverse direction, thereby causing the lazy tongs 30 to retract and draw the truck 35 in position on the carrier frame wheel tracks 59. The movement of the truck 35 causes the vehicle to roll onto the trackways 59. The motor 25 is deenergized when the car is properly positioned on the carrier frame 19. The elevator operator will now bring about the movement of the elevator to the proper floor.

When the fire doors in the elevator hatchway on this floor have opened, the elevator operator will operate his controller 57 to bring about the energization of the motor 37 to drive the carrier frame 19 transversely from the elevator platform along the rails 16 on the storage floor, until the carrier frame is in alignment with the proper stall. It will be assumed that the elevator operator wishes to store a car in a stall located on the same side of the building as the loading station. In this event, after the tracks 59 on the carrier frame are properly aligned with the tracks 75 of the storage stall, the elevator operator brings about the energization of the motor 25 to move the transfer truck 35 and consequently the vehicle into position on the storage rack. The motor 63 is now energized to bring about the withdrawal of the rollers 72 from position on either side of the rear wheels of the vehicle. The motor 25 is then again energized to draw the transfer truck 35 onto the carrier frame. The carrier frame is now moved transversely on the elevator platform. The elevator may now be dispatched to the loading floor. This is the normal operation in the event a vehicle is stored in one of the storage stalls on the same side of the building from which it is loaded.

The operation is somewhat different in the event that the elevator operator selects a stall on the other side of the building. In this case the elevator operator will bring about the energization of the motor 63 after the vehicle has been moved onto the tracks 59 to withdraw the rollers 73 from position on either side of the vehicle wheels. He will then bring about the energization of the motor 45 to operate to the positioning roller 51. The positioning roller 51 swings in above the trackway 59 and moves along by the action of the screw shaft 48 until the front wheel of the vehicle is engaged. The further movement of the positioning roller 51 propels the vehicle until the front wheels thereof are adjacent to the rollers of the truck 61. The motor of this truck is energized to extend its rollers on either side of the front wheels of the vehicle. Now when the proper floor is reached, the carrier 19 will be moved transversely off the elevator platform in the same manner as before, until its wheel tracks 59 are in alignment with the wheel tracks of the proper stall. The motor 59' will then be energized to project the vehicle into the proper stall. The motor of the truck 61 is then energized to withdraw the rollers from position on either side of the front wheels of the vehicle. The operation of the motor 59' then serves to bring the truck 61 onto the carrier frame. The carrier frame 19 is then returned to the elevator in the usual manner.

In order to carry the electrical energy from the elevator to the carrier frame, a cable reel may be provided on the elevator, or the carrier frame may obtain its energy by a rail or trolley.

When it is desired to withdraw a vehicle from storage, the elevator is raised in the usual manner to the proper floor and the carrier frame 19 is moved transversely until in alignment with the proper stall. One of the transfer trucks 35 or 61 is projected, depending upon which side of the building the desired vehicle is stored and the rollers associated with the projected transfer truck are extended on either side of the vehicle wheels. The truck is then returned to the carrier 19, rolling the vehicle with it. The carrier frame is then moved onto the elevator which is returned to the loading floor. The car is then discharged in an obvious manner. The positioning roller 51 is, of course, operated to properly position the vehicle when cars are taken from storage on the same side of the building as the loading station, since they are delivered on the opposite side of the building. This operation is thought to be obvious.

The electrical control circuits for bringing about the above operations of the vehicle handling equipment, whether these operations are performed automatically or manually, may be variously modified and any suitable circuit arrangement known to those skilled in the art may be employed. Various protective circuits may also be used to prevent the transverse movement of the carrier frame under certain conditions. The various circuit arrangements are immaterial so far as the present invention is concerned.

The modification of my invention shown in Fig. 5 provides a modified arrangement for projecting the rollers of the transfer truck, such as 35, on either side of the vehicle wheels. In this instance, in order to project and return the roller arm spreaders 67, lazy tongs 100 and 101 are employed. The lazy tongs 100 are connected by the lever arm 102 to the operating member or core 103 of the solenoid magnet 104. The lever arm 102 is pivoted at the point 105 and is also pivotally connected to the core 103 at 106. The lazy tongs 101 are similarly connected to the core 107 of the magnet 108 by the lever 109 at the pivot 110. A lever arm 111 is connected to the cores 103 and 107 of the magnets 104 and 108 and is pivoted at the point 112. The core member 103 of the magnet 104 is adapted to project the lazy tongs 100 and the lazy tongs 101 through the link connection 111 when it is energized. When the magnet 108 is energized the core member 107 is moved so as to retract both the lazy tongs 100 and 101. In order to accomplish this operation of the solenoid magnets 104 and 108, their cores are constructed partly of the magnetic material and partly of non-magnetic material in an obvious manner. By the use of the lazy tongs 100 and 101, the rollers 72 may be projected very rapidly. This follows because the operation of the solenoid itself is rapid and also because its motion is multiplied by the lazy tongs.

In a like manner the lazy tongs 30 and 60 serve to project and return the positioning trucks 35 and 61 very rapidly.

My invention is not limited to the particular arrangement of apparatus described, but may be variously changed and modified without departing from the spirit and scope thereof as indicated in the appended claims.

I claim:

1. In an apparatus for handling automobiles and like vehicles, the combination with a movable platform, a truck like structure carried by said platform, a pair of lazy tongs connected to said platform and said truck like structure for moving said truck structure with respect to said platform.

2. In an apparatus for handling automobiles and like vehicles, the combination with a movable platform, a truck like structure carried by said platform, a pair of lazy tongs connected to said platform and said truck like structure for projecting and returning said truck like structure from and to said platform.

3. In an apparatus for handling automobiles and like vehicles, the combination with a movable platform, a truck like structure carried by said platform, a pair of lazy tongs connected to said platform and said truck like structure for moving said truck structure with respect to said platform, and a vehicle engaging member carried by said structure.

4. In an apparatus for handling automobiles and like vehicles, the combination with a movable platform, a truck like structure carried by said platform, a pair of lazy tongs connected to said platform and said truck like structure for moving said truck structure with respect to said platform, and vehicle wheel engaging members carried by said structure.

5. In an apparatus for handling automobiles and like vehicles, the combination with a movable platform, a truck-like structure carried by said platform, of a pair of lazy tongs connected to said platform and said truck-like structure for moving said truck structure with respect to said platform, and a vehicle engaging member carried by said structure and movable with respect to said structure.

6. In an apparatus for handling automobiles and like vehicles, the combination with a movable platform, a truck-like structure carried by said platform, a pair of lazy tongs connected to said platform and said truck like structure for moving said truck structure with respect to said platform and vehicle wheel engaging members carried by said structure and movable with respect to the structure.

7. In an apparatus for handling automobiles and like vehicles, the combination with a movable platform, a truck-like structure carried by said platform, of a pair of lazy tongs connected to said platform and said truck-like structure for moving said truck structure with respect to said platform, a vehicle engaging member carried by said structure and a pair of lazy tongs for moving said members with respect to said truck.

8. In an apparatus for handling automobiles and like vehicles, a movable platform, two truck-like structures carried by said platform, either one of which being adapted to move a vehicle with respect to said platform and mechanism on said platform for transferring a vehicle from the control of one truck-like structure to the other.

9. In an apparatus for handling automobiles and like vehicles, a movable platform, two truck-like structures carried by said platform either one of which being adapted to move a vehicle with respect to said platform, and a member carried by said platform having a fixed path of travel for transferring a vehicle from the control of one truck-like structure to the other.

10. In an apparatus for handling automobiles and like vehicles, a movable platform, two truck-like structures carried by said platform, one of the truck-like structures being adapted to move a vehicle in one direction off the platform and the other being adapted to move a vehicle in the other direction off the platform, mechanism for transferring a vehicle from the control of one truck-like structure to the other and vehicle wheel engaging members carried by said truck like structures.

11. In an apparatus for handling automobiles and like vehicles, a movable platform, two truck-like structures carried by said platform, one of the truck-like structures being adapted to move a vehicle in one direction off the platform and the other being adapted to move a vehicle in the other direction off the platform, mechanism for transferring a vehicle from the control of one truck-like structure to the other, and vehicle wheel engaging members carried by said truck-like structures, and movable with respect to each structure.

SAMUEL E. BUETTELL.